(12) United States Patent
Parikh et al.

(10) Patent No.: US 9,749,242 B2
(45) Date of Patent: Aug. 29, 2017

(54) NETWORK PLATFORM AS A SERVICE LAYER FOR OPEN SYSTEMS INTERCONNECTION COMMUNICATION MODEL LAYER 4 THROUGH LAYER 7 SERVICES

(71) Applicant: AT&T Intellectual Property I, L.P., Atlanta, GA (US)

(72) Inventors: Anisa Parikh, Holmdel, NJ (US); Neela R. Atluri, Marlboro, NJ (US); Paritosh Bajpay, Edison, NJ (US); Sekar Ganesan, Ocean, NJ (US); Shobhna Goyal, Marlboro, NJ (US); Shiv Kumar, Marlboro, NJ (US); Magda K. Nassar, Tinton Falls, NJ (US); Satyendra Tripathi, E Brunswick, NJ (US); Ralph Utano, Fair Haven, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 350 days.

(21) Appl. No.: 14/464,254

(22) Filed: Aug. 20, 2014

(65) Prior Publication Data
US 2016/0057071 A1 Feb. 25, 2016

(51) Int. Cl.
*H04L 12/24* (2006.01)
*H04L 12/801* (2013.01)
*G06F 9/50* (2006.01)

(52) U.S. Cl.
CPC ............. *H04L 47/10* (2013.01); *G06F 9/50* (2013.01); *G06F 9/5005* (2013.01);
(Continued)

(58) Field of Classification Search
CPC ...... G06F 11/3495; G06F 9/50; G06F 9/5072; G06F 9/5005; G06F 9/5011; H04B 3/32;
(Continued)

(56) References Cited

U.S. PATENT DOCUMENTS 7,466,710 B1 12/2008 Clemm et al.
7,574,496 B2 8/2009 Mccrory et al.
(Continued)

OTHER PUBLICATIONS

U.S. Office Action dated Aug. 12, 2015 in U.S. Appl. No. 14/464,283.
(Continued)

*Primary Examiner* — Le H Luu
(74) *Attorney, Agent, or Firm* — Hartman & Citrin LLC

(57) ABSTRACT

According to one aspect of the concepts and technologies disclosed herein, a cloud computing system can include a hardware resource and a Network Platform as a Service ("NPaaS") layer. The NPaaS layer can expose a cloud service for use by a service that operates within at least one of layer 4 through layer 7 of the Open Systems Interconnection ("OSI") communication model. The cloud service can include a database service, an application container service, a resource broker service, a load balancer service, a domain name system ("DNS") service, a state persistence service, a probe service, or a combination thereof. The NPaaS also can receive a request for the cloud service, and in response to the request, can provide the cloud service.

20 Claims, 6 Drawing Sheets

(52) U.S. Cl.
CPC .......... *G06F 9/5011* (2013.01); *G06F 9/5072* (2013.01); *H04L 41/50* (2013.01); *H04L 41/5012* (2013.01)

(58) Field of Classification Search
CPC ..... H04L 12/12; H04L 12/28; H04L 41/0896; H04L 47/783; H04L 63/029; H04L 41/50; H04L 41/5012; H04M 3/22; H04M 3/5233
See application file for complete search history.

(56) References Cited

U.S. PATENT DOCUMENTS

| | | |
|---|---|---|
| 7,603,671 B2 | 10/2009 | Liu |
| 7,818,002 B2 | 10/2010 | Bajko et al. |
| 7,869,364 B2 | 1/2011 | Griffith et al. |
| 8,032,413 B2 | 10/2011 | Carlson |
| 8,190,740 B2 | 5/2012 | Stienhans et al. |
| 8,209,415 B2 | 6/2012 | Wei |
| 8,218,557 B2 | 7/2012 | Kean et al. |
| 8,244,559 B2 | 8/2012 | Horvitz et al. |
| 8,250,215 B2 | 8/2012 | Stienhans et al. |
| 8,271,653 B2 | 9/2012 | Dehaan |
| 8,276,140 B1 | 9/2012 | Beda et al. |
| 8,433,802 B2 | 4/2013 | Head et al. |
| 8,514,868 B2 | 8/2013 | Hill |
| 8,515,433 B2 | 8/2013 | Vaswani et al. |
| 8,572,612 B2 | 10/2013 | Kern |
| 8,606,878 B2 | 12/2013 | Ferris |
| 8,615,745 B2 | 12/2013 | Blainey et al. |
| 8,615,746 B2 | 12/2013 | Blainey et al. |
| 8,656,019 B2 | 2/2014 | Chikando et al. |
| 8,700,946 B2 | 4/2014 | Reddy et al. |
| 8,724,620 B2 | 5/2014 | Ku et al. |
| 8,739,157 B2 | 5/2014 | Ho et al. |
| 8,832,669 B2 | 9/2014 | Blainey et al. |
| 8,959,484 B2 | 2/2015 | Pinnix |
| 9,621,428 B1 | 4/2017 | Lev et al. |
| 2005/0027870 A1 | 2/2005 | Trebes, Jr. |
| 2005/0176428 A1 | 8/2005 | Gabor et al. |
| 2006/0146792 A1 | 7/2006 | Ramachandran |
| 2007/0036151 A1 | 2/2007 | Baeder |
| 2007/0106769 A1 | 5/2007 | Liu |
| 2008/0025221 A1 | 1/2008 | Lipps |
| 2008/0209007 A1 | 8/2008 | Gurecki |
| 2008/0215736 A1 | 9/2008 | Astrom et al. |
| 2008/0254795 A1 | 10/2008 | Ratcliffe |
| 2009/0067409 A1 | 3/2009 | Ku |
| 2009/0097398 A1 | 4/2009 | Belinchon Vergara et al. |
| 2009/0116505 A1 | 5/2009 | Bhatia et al. |
| 2009/0300210 A1 | 12/2009 | Ferris |
| 2010/0136970 A1 | 6/2010 | Mui et al. |
| 2010/0274680 A1 | 10/2010 | Carlson |
| 2010/0296443 A1 | 11/2010 | Hirano et al. |
| 2011/0093584 A1 | 4/2011 | Qiu et al. |
| 2011/0117888 A1 | 5/2011 | Klein et al. |
| 2011/0119312 A1 | 5/2011 | Chopra et al. |
| 2011/0119729 A1 | 5/2011 | Bergeson et al. |
| 2011/0126168 A1 | 5/2011 | Ilyayev |
| 2011/0145836 A1 | 6/2011 | Wheeler et al. |
| 2011/0252420 A1 | 10/2011 | Tung et al. |
| 2011/0295996 A1 | 12/2011 | Qiu et al. |
| 2012/0011077 A1 | 1/2012 | Bhagat |
| 2012/0030331 A1 | 2/2012 | Karampatsis |
| 2012/0072581 A1 | 3/2012 | Tung et al. |
| 2012/0096045 A1 | 4/2012 | Moore et al. |
| 2012/0102183 A1 | 4/2012 | Murakami et al. |
| 2012/0124211 A1 | 5/2012 | Kampas et al. |
| 2012/0131591 A1 | 5/2012 | Moorthi et al. |
| 2012/0158921 A1 | 6/2012 | Asveren et al. |
| 2012/0203823 A1 | 8/2012 | Manglik et al. |
| 2012/0281706 A1 | 11/2012 | Agarwal et al. |
| 2012/0297059 A1 | 11/2012 | Bross |
| 2012/0300615 A1 | 11/2012 | Kempf et al. |
| 2012/0311154 A1 | 12/2012 | Morgan |
| 2013/0031550 A1 | 1/2013 | Choudhury et al. |
| 2013/0054670 A1 | 2/2013 | Keyes |
| 2013/0091284 A1 | 4/2013 | Rothschild |
| 2013/0091285 A1 | 4/2013 | Devarakonda et al. |
| 2013/0124401 A1 | 5/2013 | Del Real |
| 2013/0124712 A1 | 5/2013 | Parker |
| 2013/0145367 A1 | 6/2013 | Moss et al. |
| 2013/0182702 A1 | 7/2013 | Ku |
| 2013/0188489 A1 | 7/2013 | Sato |
| 2013/0227673 A1 | 8/2013 | Yoon |
| 2013/0268913 A1 | 10/2013 | Anderson et al. |
| 2013/0286861 A1 | 10/2013 | Smith et al. |
| 2013/0291052 A1 | 10/2013 | Hadar et al. |
| 2013/0303114 A1 | 11/2013 | Ahmad et al. |
| 2013/0304904 A1 | 11/2013 | Mouline et al. |
| 2013/0311778 A1 | 11/2013 | Cherukuri et al. |
| 2013/0326036 A1 | 12/2013 | Heumesser et al. |
| 2013/0344897 A1 | 12/2013 | Pierce, II et al. |
| 2014/0010084 A1 | 1/2014 | Kavunder et al. |
| 2014/0032850 A1 | 1/2014 | Phelan et al. |
| 2014/0033268 A1 | 1/2014 | Julisch et al. |
| 2014/0059226 A1 | 2/2014 | Messerli et al. |
| 2014/0068611 A1 | 3/2014 | McGrath et al. |
| 2014/0068703 A1 | 3/2014 | Bzlus et al. |
| 2014/0074973 A1 | 3/2014 | Kumar et al. |
| 2014/0082699 A1 | 3/2014 | Eicken et al. |
| 2014/0086177 A1 | 3/2014 | Adjakple et al. |
| 2014/0109188 A1 | 4/2014 | Pavlov et al. |
| 2014/0112139 A1 | 4/2014 | Allan et al. |
| 2014/0115578 A1 | 4/2014 | Cooper et al. |
| 2014/0115583 A1 | 4/2014 | Lee et al. |
| 2014/0123129 A1 | 5/2014 | Risbood et al. |
| 2014/0130038 A1 | 5/2014 | Lucovsky et al. |
| 2014/0146673 A1 | 5/2014 | Parker |
| 2014/0149485 A1 | 5/2014 | Sharma et al. |
| 2014/0149492 A1 | 5/2014 | Ananthanarayanan et al. |
| 2014/0156850 A1 | 6/2014 | Hunt |
| 2014/0189109 A1 | 7/2014 | Jang |
| 2014/0201374 A1 | 7/2014 | Ashwood-Smith |
| 2014/0279201 A1 | 9/2014 | Iyoob et al. |
| 2014/0280848 A1 | 9/2014 | Modh et al. |
| 2014/0280918 A1 | 9/2014 | Grandhe et al. |
| 2014/0280964 A1 | 9/2014 | Farooq et al. |
| 2014/0280966 A1 | 9/2014 | Sapuram et al. |
| 2014/0282037 A1 | 9/2014 | Narasimhan et al. |
| 2014/0282525 A1 | 9/2014 | Sapuram et al. |
| 2014/0282536 A1 | 9/2014 | Dave et al. |
| 2014/0317166 A1 | 10/2014 | Iyoob et al. |
| 2014/0317293 A1 | 10/2014 | Shatzkamer |
| 2015/0007169 A1 | 1/2015 | Li et al. |
| 2015/0033365 A1 | 1/2015 | Mellor et al. |
| 2015/0063166 A1 | 3/2015 | Sif |
| 2015/0120890 A1 | 4/2015 | Ghai |
| 2015/0142958 A1 | 5/2015 | Tamura |
| 2015/0149611 A1 | 5/2015 | Lissack |
| 2015/0180730 A1 | 6/2015 | Feldstaine |
| 2015/0180948 A1* | 6/2015 | Shao ................... H04L 47/783 709/203 |
| 2015/0295750 A1 | 10/2015 | Blanco |
| 2015/0326535 A1* | 11/2015 | Rao ..................... H04L 63/029 726/15 |
| 2015/0347264 A1 | 12/2015 | Mohammed |
| 2015/0347759 A1 | 12/2015 | Cabrera |
| 2015/0358248 A1 | 12/2015 | Saha et al. |
| 2015/0363423 A1 | 12/2015 | Utgikar |
| 2015/0378703 A1 | 12/2015 | Govindaraju et al. |
| 2016/0013985 A1* | 1/2016 | Reddy ................ H04L 41/0896 726/4 |
| 2016/0028434 A1* | 1/2016 | Kerpez .................... H04B 3/32 379/406.02 |
| 2016/0036835 A1 | 2/2016 | Lietz |
| 2016/0036983 A1* | 2/2016 | Korolev ............... H04M 3/5233 379/265.12 |
| 2016/0047566 A1* | 2/2016 | Haga ..................... H04L 12/28 702/184 |
| 2016/0080496 A1* | 3/2016 | Falanga ................. H04M 3/22 709/217 |

(56) References Cited

U.S. PATENT DOCUMENTS

| 2016/0112875 | A1* | 4/2016 | Kasravi | H04L 12/12 455/411 |
|---|---|---|---|---|
| 2016/0188877 | A1 | 6/2016 | Simha | |
| 2016/0216994 | A1* | 7/2016 | Sefidcon | G06F 11/3495 |
| 2016/0241446 | A1 | 8/2016 | Gupte et al. | |

OTHER PUBLICATIONS

U.S. Office Action dated Feb. 18, 2016 in U.S. Appl. No. 14/464,241.
U.S. Office Action dated Dec. 17, 2015 in U.S. Appl. No. 14/464,283.
U.S. Office Action dated Apr. 10, 2015 in U.S. Appl. No. 14/464,283.
Binz, Tobias, et al. "Portable Cloud Services Using TOSCA." IEEE Internet Computing 16.3 (2012).
Somorovsky, Juraj, et al. "All your clouds are belong to us: security analysis of cloud management interfaces." Proceedings of the 3rd ACM workshop on Cloud computing security workshop. ACM, 2011.
Xu, Cheng-Zhong, Jia Rao, and Xiangping Bu. "URL: A unified reinforcement learning approach for autonomic cloud management." Journal of Parallel and Distributed Computing 72.2 (2012): 95-105.
Rochwerger, Benny, et al. "Reservoir—when one cloud is not enough." IEEE computer 44.3 (2011): 44-51.
Sotomayor, Borja, et al. "Virtual infrastructure management in private and hybrid clouds." Internet Computing, IEEE 13.5 (2009): 14-22.
Harmer, Terence, et al. "An application-centric model for cloud management." Services (SERVICES-1), 2010 6th World Congress on. IEEE, 2010.
Stanek, Jan, Lukas Kencl, and Jiri Kuthan. "Characteristics of real open Sip-Server traffic." Passive and Active Measurement. Springer Berlin Heidelberg, 2013.
Kim, Jong Yul, and Henning Schulzrinne. "SipCloud: dynamically scalable SIP proxies in the cloud." Proceedings of the 5th International Conference on Principles, Systems and Applications of IP Telecommunications. ACM, 2011.
Scholler, Marcus, et al. "Resilient deployment of virtual network functions." Ultra Modern Telecommunications and Control Systems and Workshops (ICUMT), 2013 5th International Congress on. IEEE, 2013.
"Network Functions Virtualisation (NFV); Use Cases", ETSI, Oct. 2013.
"Virtualizing Network Services—the Telecom Cloud", Ericsson, Mar. 28, 2014.
"The Role of Layer 4-7 Services in Scaling Applications for the Cloud-Computing Data Center", Cisco, 2011.
Kächele, Steffen, et al. "Beyond IaaS and PaaS: An extended cloud taxonomy for computation, storage and networking." Proceedings of the 2013 IEEE/ACM 6th International Conference on Utility and Cloud Computing. IEEE Computer Society, 2013.
Ravindran, Ravishankar, et al. "Towards software defined ICN based edge-cloud services." Cloud Networking (CloudNet), 2013 IEEE 2nd International Conference on. IEEE, 2013.
"Software Defined Network and Network Functions Virtualization", Vikram Nair, 2014.
Manzalini, Antonio, and Roberto Saracco. "Software Networks at the Edge: A Shift of Paradigm." Future Networks and Services (SDN4FNS), IEEE, 2013.
Manzalini, Antonio, et al. "Clouds of virtual machines in edge networks." Communications Magazine, IEEE 51.7 (2013).
"The Real-Time Cloud", Ericsson, Feb. 2014.
U.S. Office Action dated Apr. 6, 2016 in U.S. Appl. No. 14/464,222.
U.S. Office Action dated May 18, 2016 in U.S. Appl. No. 14/464,261.
Basilier et al., "Virtualizing network services—the telecom cloud," Ericsson Review, Mar. 28, 2014, Ericsson.
White paper from ONUG Board of Directors, "Open Networking Challenges and Opportunities," Jul. 2014.
U.S. Office Action dated Oct. 20, 2016 in U.S. Appl. No. 14/464,212.
U.S. Office Action dated Jul. 12, 2016 in U.S. Appl. No. 14/464,283.
U.S. Office Action dated Oct. 31, 2016 in U.S. Appl. No. 14/464,283.
U.S. Office Action dated Nov. 2, 2016 in U.S. Appl. No. 14/464,222.
U.S. Office Action dated Jan. 12, 2017 in U.S. Appl. No. 14/464,261.
U.S. Interview Summary dated Jun. 2, 2017 in U.S. Appl. No. 14/464,283.
U.S. Notice of Allowance dated Jun. 2, 2017 in U.S. Appl. No. 14/464,283.
U.S. Office Action dated Apr. 20, 2017 in U.S. Appl. No. 14/464,222.

* cited by examiner

NETWORK PLATFORM AS A SERVICE LAYER FOR OPEN SYSTEMS INTERCONNECTION COMMUNICATION MODEL LAYER 4 THROUGH LAYER 7 SERVICES

BACKGROUND

Services that are delivered via layers 4-7 of the Open Systems Interconnection ("OSI") communication model have specialized requirements for a set of common services that are not supported by cloud computing systems. This complicates deployment and support of layer 4-7 services in a cloud computing system and requires each service to implement separately the set of common services, impacting rapid roll-out of layer 4-7 services in a cloud computing system.

SUMMARY

Concepts and technologies disclosed herein are directed to a Network Platform as a Service ("NPaaS") layer that exposes cloud services ("NPaaS services") that can be used by Open Systems Interconnection ("OSI") communication model layer 4-7 services. The NPaaS services can be used by a service provider, such as, but not limited to, a telecommunication service provider that provides voice over long-term evolution ("VoLTE"), video communications, and/or other "real-time" services. "Real-time" can be measured in milliseconds/microseconds and is the responsiveness used to support the low timing threshold for session initiation protocol ("SIP") queries and responses, and the like.

According to one aspect of the concepts and technologies disclosed herein, a cloud computing system can include a hardware resource and an NPaaS layer. The NPaaS layer can expose a cloud service for use by a service that operates within at least one of layer 4 through layer 7 of the OSI communication model. The cloud service can include a database service, an application container service, a resource broker service, a load balancer service, a domain name system ("DNS") service, a state persistence service, a probe service, or a combination thereof. The NPaaS also can receive a request for the cloud service, and in response to the request, can provide the cloud service.

According to another aspects of the concepts and technologies disclosed herein, a cloud computing system can include a hardware resource layer that includes a plurality of hardware resources. The cloud computing system also can include a virtualization layer that includes a plurality of virtual machine monitors. The virtual machine monitors can create and manage a plurality of virtual network functions ("VNFs") that utilize, at least in part, the plurality of hardware resources. The cloud computing system also can include a virtual resource layer that includes the plurality of VNFs. The cloud computing system also can include an NPaaS layer that exposes a plurality of cloud services for use in implementing a service that operates within at least one of layer 4 through layer 7 of the OSI communication model.

The plurality of cloud services can include a database service that provides a common pool of database resources, a data replication function, and a distributed data cache grid. The plurality of cloud services can include an application container service that provides a common pool of containers in which to host applications. The plurality of cloud services can include a resource broker and load balancer service that provide a capability of distributing requests across the plurality of VNFs. The plurality of cloud services can include a DNS service that provides address resolution functions and domain name system translation functions. The plurality of cloud services can include a state persistence service that provides persistence of state in the cloud computing system. The plurality of cloud services can include a probe service that provides session tracing functions.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Concepts and technologies disclosed herein are directed to a Network Platform as a Service ("NPaaS") layer that exposes cloud services ("NPaaS services") that can be used by Open Systems Interconnection ("OSI") communication model layer 4-7 services. The NPaaS services can be used by a service provider, such as, but not limited to, a telecommunication service provider that provides voice over long-term evolution ("VoLTE"), video communications, and/or other "real-time" services. "Real-time" can be measured in milliseconds/microseconds and is the responsiveness used to support the low timing threshold for session initiation protocol ("SIP") queries and responses, and the like.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
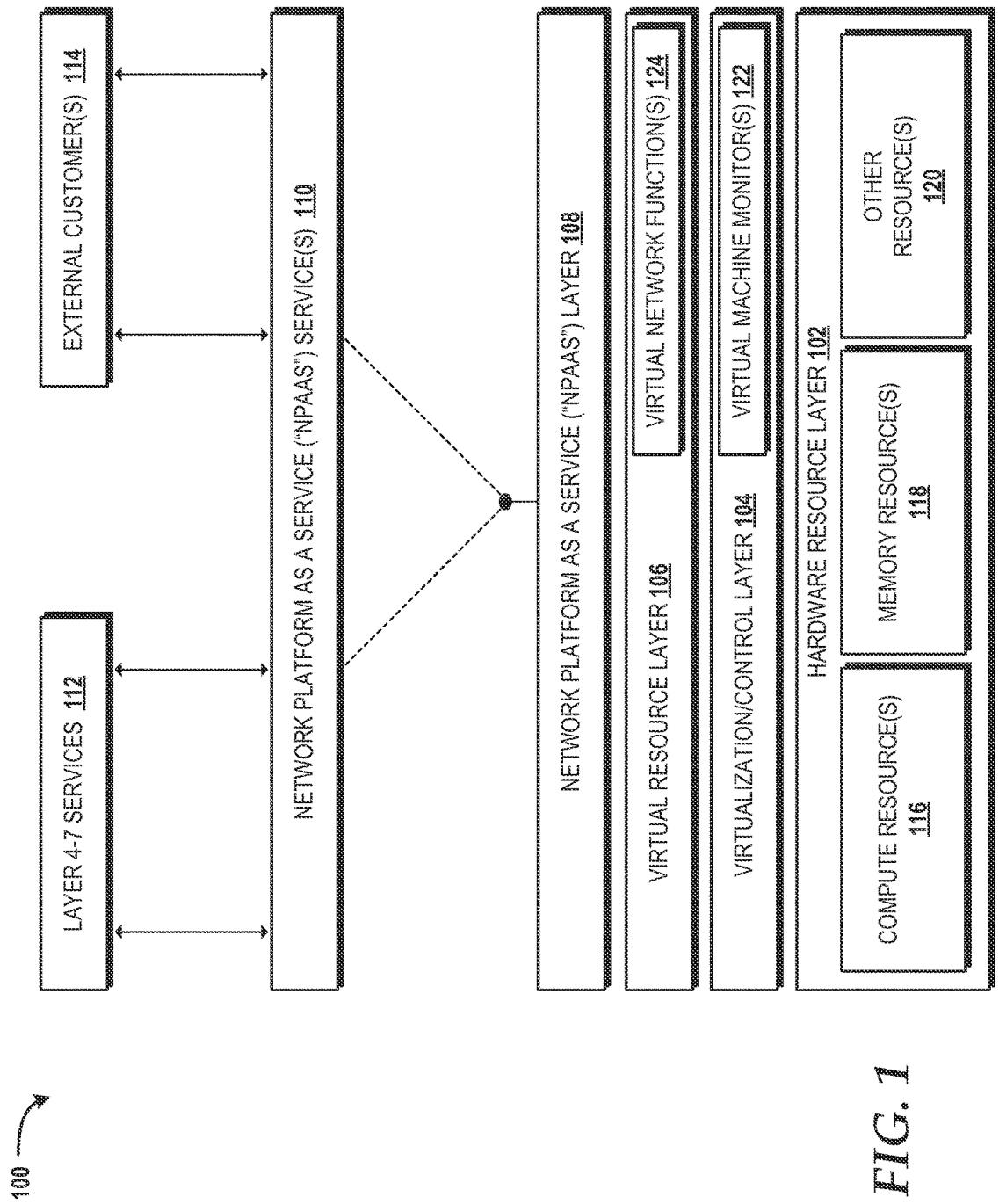
FIG. 1 is a block diagram illustrating aspects of an illustrative cloud computing system for implementing the various concepts and technologies disclosed herein.

Turning now to FIG. 1, a block diagram illustrating aspects of an illustrative cloud computing system 100 for implementing the various concepts and technologies disclosed herein will be described. The illustrated cloud computing system 100 includes a hardware resource layer 102, a virtualization/control layer 104, a virtual resource layer 106, and an NPaaS layer 108. The NPaaS layer 108 can expose one or more cloud services ("NPaaS services") 110 that can be utilized to create and manage one or more OSI communication layer 4-7 services (hereinafter "layer 4-7 service(s)") 112. The NPaaS layer 108 also can expose the NPaaS service(s) 110 to be utilized by one or more external customers 114 to create and manage other OSI communication layer 4-7 services and/or other services (not shown). In some embodiments, the layer 4-7 service(s) 112 is/are created by a service provider that owns and/or operates the NPaaS layer 108 and that may own and/or operate other components of the cloud computing system 100. In some other embodiments, the layer 4-7 service(s) 112 is/are created by one or more other service providers that do not own and/or operate the NPaaS layer 108.

While connections are shown between some of the components illustrated in FIG. 1, it should be understood that some, none, or all of the components illustrated in FIG. 1 can be configured to interact with one other to carry out various functions described herein. In some embodiments, the components are arranged so as to communicate via one or more networks (best shown in FIG. 6). Thus, it should be understood that FIG. 1 and the following description are intended to provide a general understanding of a suitable environment in which various aspects of embodiments can be implemented, and should not be construed as being limiting in any way.

The hardware resources layer 102 provides hardware resources, which, in the illustrated embodiment, include one or more compute resources 116, one or more memory resources 118, and one or more other resources 120. The compute resource(s) 116 can include one or more hardware components that perform computations to process data, and/or to execute computer-executable instructions of one or more application programs, operating systems, and/or other software. The compute resource(s) 116 can include one or more central processing units ("CPUs") configured with one or more processing cores. The compute resource(s) 116 can include one or more graphics processing units ("GPUs") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resource(s) 116 can include one or more discrete GPUs. In some other embodiments, the compute resource(s) 116 can include CPU and GPU components that are configured in accordance with a co-processing CPU/GPU computing model, wherein the sequential part of an application executes on the CPU and the computationally-intensive part is accelerated by the GPU. The compute resource(s) 116 can include one or more system-on-chip ("SoC") components along with one or more other components, including, for example, one or more of the memory resources 118, and/or one or more of the other resources 120. In some embodiments, the compute resource(s) 116 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resource(s) 116 can be or can include one or more hardware components architected in accordance with an ARM architecture, available for license from ARM HOLDINGS of Cambridge, United Kingdom. Alternatively, the compute resource(s) 116 can be or can include one or more hardware components architected in accordance with an x86 architecture, such an architecture available from INTEL CORPORATION of Mountain View, Calif., and others. Those skilled in the art will appreciate the implementation of the compute resource(s) 116 can utilize various computation architectures, and as such, the compute resource(s) 116 should not be construed as being limited to any particular computation architecture or combination of computation architectures, including those explicitly disclosed herein.

The memory resource(s) 118 can include one or more hardware components that perform storage operations, including temporary or permanent storage operations. In some embodiments, the memory resource(s) 118 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 116.

The other resource(s) 120 can include any other hardware resources that can be utilized by the compute resources(s) 116 and/or the memory resource(s) 118 to perform operations described herein. The other resource(s) 120 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 102 can be virtualized by one or more virtual machine monitors ("VMMs") 122 (also known as "hypervisors") operating within the virtualization/control layer 104 to create one or more virtual resources that reside in the virtual resource layer 106. The VMMs 122 can be or can include software, firmware, and/or hardware that alone or in combination with other software, firmware, and/or hardware, creates one or more virtual resources operating within the virtual resource layer 106.

The virtual resources operating within the virtual resource layer 106 can include abstractions of at least a portion of the compute resources 116, the memory resources 118, and/or the other resources 120, or any combination thereof. In the illustrated embodiment, the virtual resource layer 106 includes special-purpose virtual machines referred to herein as virtual network functions ("VNFs") 124. The VNFs 124 can be virtualizations of any network functions that perform, at least in part, one or more operations to support one or more of the NPaaS services 110.

The NPaaS services 110 can include, in some embodiments, a set of common cloud services that can be used by OSI communication model layer 4-7 services, some examples of which are described below. The NPaaS services 110 can include application container services, database services, resource broker services, load balancer services, domain name system ("DNS") service, state persistence service, and probe service, as will be described below with reference to FIG. 2.

Layer 4 of the OSI communication model, also known as the Transport Layer, ensures end-to-end delivery of messages for both "connection-mode" data such as transfer control protocol ("TCP") connections and "connectionless-mode" data such as user datagram protocol ("UDP") datagrams. For both modes, the endpoints of communication are identified by port numbers such as TCP port 80 or UDP port 161. Layer 5 of the OSI communication model, also known as the Session Layer, provides services for coordinating communication between applications and synchronizing message delivery. For example, a protocol with suspend and resume or checkpoint and rollback capabilities includes session layer services such as, for example, International Telecommunication Union ("ITU") X.225, APPLETALK available from APPLE INC., and remote procedure call ("RPC"). Layer 6 of the OSI communication model, also known as the Presentation Layer, provides services for converting data from local format (i.e., abstract syntax) into a machine-independent format (i.e., transfer syntax). Some application protocols are defined in Abstract Syntax Notation One ("ASN.1") notation. ASN.1 defines a set of data structures mapped to encoding rules for example, how an Integer should be encoded into a bit string to be transmitted to and decoded by a recipient using XML Encoding Rules (XER). Layer 7 of the OSI communication model, also known as the Application Layer, provides common services used by applications to establish, release, and abort communication with each other, as well as specific services. Most applications function within layer 7.

Figure 2:
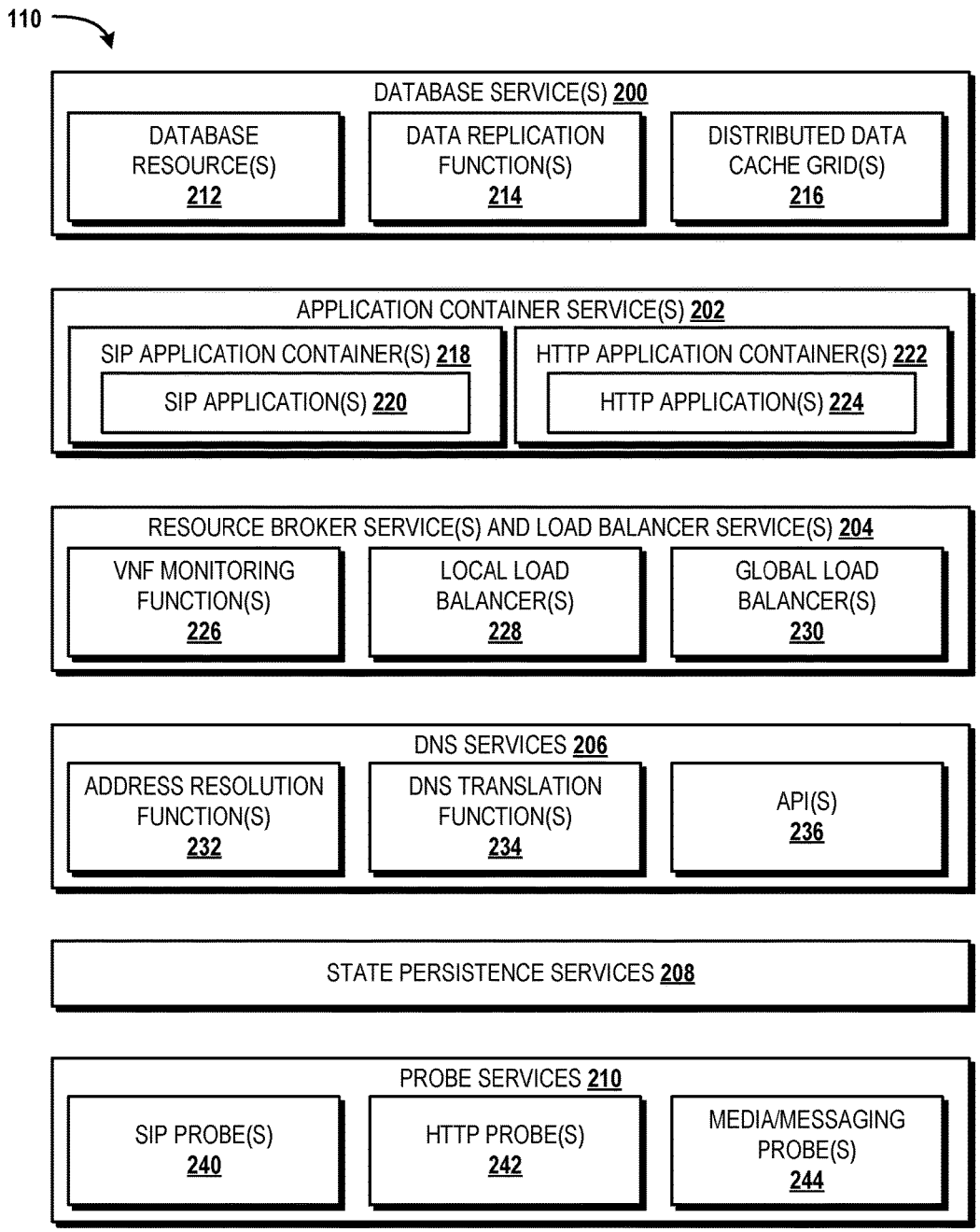
FIG. 2 is a block diagram illustrating aspects of several Network Platform as a Service ("NPaaS") services exposed by an NPaaS layer, according to an illustrative embodiment.

Turning now to FIG. 2, a block diagram illustrating aspects of several NPaaS services 110 that can be exposed by the NPaaS layer 108 will be described, according to an illustrative embodiment. The illustrated NPaasS services 110 include one or more database services 200, one or more application container services 202, one or more resource broker services and one or more load balancer services 204, one or more DNS services 206, one or more state persistence services 208, and one or more probe services 210. It should be understood that the NPaaS services 110 can include other services that can be utilized by the layer 4-7 services 112 and/or the external customer(s) 114, and as such, the illustrated NPaaS services 110 should not be construed as being limiting in any way.

The database service(s) 200 can provide access to one or more database resources 212, one or more data replication function(s) 214, and one or more distributed data cache grids 216. The database service(s) 200 can provide one or more common application databases that can be used by multiple real-time layer 4-7 services. The common application database(s) can be used to provide value-added services to customers. The common application database(s) can also be used for data mining purposes. The database resource(s) 212 can be based upon object stores. The database resource(s) 212 can be based upon relational databases, including, for example, structured query language ("SQL"), not only SQL ("NoSQL"), key/value pair, NoSql document, and the like. The database service(s) 200 can provide throughput and predictability for database workloads, including reads, writes, inserts, and deletes, which may be used to meet the overall performance and latency specifications of real-time layer 4-7 services.

The data replication function(s) 214 can provide a mechanism for replicating data across all or a subset of the database resources 212, which may be distributed across a plurality of regions such as, for example, northwest, southwest, central, northeast, and southeast regions of the United States of America. The distributed data cache grid(s) 216 can provide a mechanism for low latency access (e.g., 2 ms response time).

The application container service(s) 202 can provide a common pool of containers in which to host applications. An application container can meet the specifications for high performance, latency, and reliability required by real-time layer 4-7 services. The illustrated application container service(s) 202 can provide access to one or more session initiation protocol ("SIP") application containers 218, each of which can host one or more SIP applications 220. For example, the SIP application(s) 220 can include one or more WEBSPHERE, available from International Business Machines Corporation, application servers with one or more SIP servlets. The illustrated application container service(s) 202 can provide access to one or more hypertext transfer protocol ("HTTP") application containers 222, each of which can host one or more HTTP applications 224. For example, the HTTP application(s) 224 can include one or more APACHE TOMCAT application servers for JAVA application, one or more APACHE HTTP servers for NODE.JS, PHP, PYTHON, and RUBY applications.

The application container service(s) 202 can support applications to enable the creation of the layer 4-7 services 112 and/or other services in a common environment. It should be understood that the application container service(s) 202 can provide access to one or more alternative or additional containers that each can host one or more applications that operate in accordance with or otherwise utilize one or more other protocols, and as such, the illustrated application container service(s) 202 should not be considered limiting in any way.

The resource broker service(s) and load balancer service(s) 204 can include one or more VNF monitoring functions 226, one or more local load balancers 228, and one or more global load balancers 230. The resource broker service(s) and load balancer service(s) 204 can support the capability of distributing requests across a cluster or pool of VNFs, such as the VNFs 124. The resource broker service(s) and load balancer service(s) 204 can monitor, via the VNF monitoring functions 226, the VNFs 124 using standard (e.g., transfer control protocol) or application specific (e.g., SIP options) monitoring capabilities. The resource broker service(s) and load balancer service(s) 204 can support distributing requests to local VNFs using the local load balancer(s) 228 as well as cross-site VNFs using the global load balancer(s) 230. If an entire local pool of VNFs fails, the global load balancer(s) 230 capability can distribute requests to a pool at another site. Session-aware (e.g. SIP, Diameter, HTTP, etc.) load balancing capabilities and client/server persistence (i.e., stickiness) may be used for some VNFs (e.g., transaction-stateful network elements such as call session control functions). Distribution of requests can be using a round-robin or least utilized algorithm, although other algorithms are contemplated. The resource broker service(s) and load balancer service(s) 204 can maintain a view of the utilization of each VNF for distribution of requests to the least utilized VNF as appropriate. The resource broker service(s) and load balancer service(s) 204 can keep track of failed VNFs and can distribute requests to in-service VNFs. The resource broker service(s) and load balancer service(s) 204 can integrate with dynamic resource allocation capabilities to trigger the instantiation of new VNFs for failures or if the existing VNFs reach peak utilization. The resource broker service(s) and load balancer service(s) 204 can support dynamic binding for new dynamically instantiated VNFs to be added to a distribution list. Instantiations of the resource broker service(s) and load balancer service(s) 204 can be customized to support the specific network functions to which requests are sent. Each instantiation of the resource broker service(s) and load balancer service(s) 204 can maintain availability state of the monitored network functions.

The DNS service(s) 206 can support address resolution via one or more address resolution functions 232. The DNS service(s) 206 can perform translation of domain names to numeric Internet protocol ("IP") addresses via one or more DNS translation functions 234. The DNS service(s) 206 can be ubiquitously deployed within the cloud computing system 100 (shown in FIG. 1). The DNS service(s) 206 can support a localized DNS view. That is, the DNS service(s) 206 can receive a request from a network function and can resolve the request to the local network function if possible. The DNS service(s) 206 can provide configuration functionality with console capabilities. The DNS service(s) 206 can provide one or more application programming interfaces ("APIs") 236. The API(s) 236 can create and manage DNS records. For example, a DNS record can be created using the API(s) 236 when a new virtual machine is created. The DNS service(s) 206 can support split-horizon DNS entries by providing a domain name (e.g., "UDNC-xx-xx-xx-xx.compute-1.sl.com") for each instance that is launched. The domain name can resolve to a private IP address associated with a virtual machine instance if queried from within the same availability region, and to a public IP address if queried from outside the cloud computing system 100 or from another region.

The state persistence service(s) 208 can provide persistence of state in the cloud computing system 100 for components that are stateful. The state persistence service(s) 208 can support the architectural trend of stateless applications in a cloud system and can enable network functions to focus on logic. The state persistence service(s) 208 can support replication of states across all or a subset of cloud availability regions. The state persistence service(s) 208 can support a highly scalable cache for quick access to state information. The state persistence service(s) 208 can support high-throughput for read and writes of state data. The state persistence service(s) 208 can be implemented, for example, using SQL or NoSql key/value pair database technologies that support a distributed cache grid (e.g., CASSANDRA available from THE APACHE SOFTWARE FOUNDATION and/or MEMCACHED).

The probe service(s) 210 can provide a common way to support probes for session tracing. The illustrated probe service(s) 210 include one or more SIP probes 240 for tracing SIP sessions. The illustrated probe service(s) 210 also include one or more HTTP probes 242 for tracing HTTP session. The illustrated probe service(s) also include one or more media/messaging probes 244 for tracing session that utilize one or more media/messaging protocols such as, but not limited to, real-time transport protocol ("RTP") and message session relay protocol ("MSRP").

Figure 3:
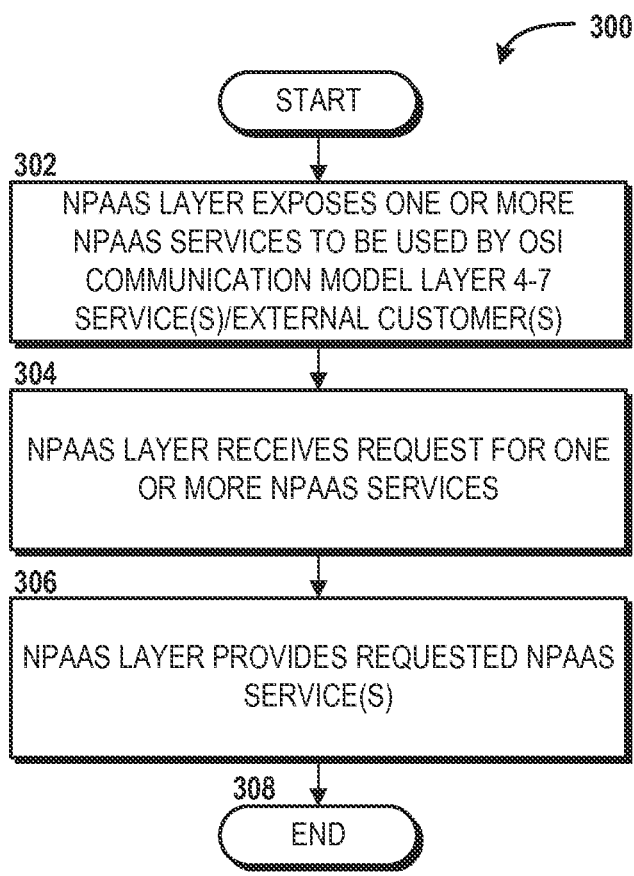
FIG. 3 is a flow diagram illustrating aspects of a method for providing an NPaaS layer, according to an illustrative embodiment.

Turning now to FIG. 3, aspects of a method 300 for providing the NPaaS layer 108 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor, such as, for example, one or more of the compute resources 116 of the hardware resource layer 102, a processor, one or more other computing systems, devices, engines, or components disclosed herein to perform operations. It should be understood that the performance of one or more operations may include operations executed by one or more virtual processors at the instructions of one or more of the aforementioned hardware processors.

The method 300 will be described with reference to FIG. 3 and further reference to FIG. 1. The method 300 begins at operation 302, where the NPaaS layer 108 exposes one or more of the NPaaS services 110 to be used by one or more of the layer 4-7 services 112 and/or one or more of the external customers 114. From operation 302, the method 300 proceeds to operation 304, where the NPaaS layer 108 receives a request for one or more of the NPaaS services 110. In response, at operation 306, the NPaaS layer 108 provides the requested NPaaS service(s) 110. From operation 306, the method 300 proceeds to operation 308. The method 300 ends at operation 308.

Figure 4:
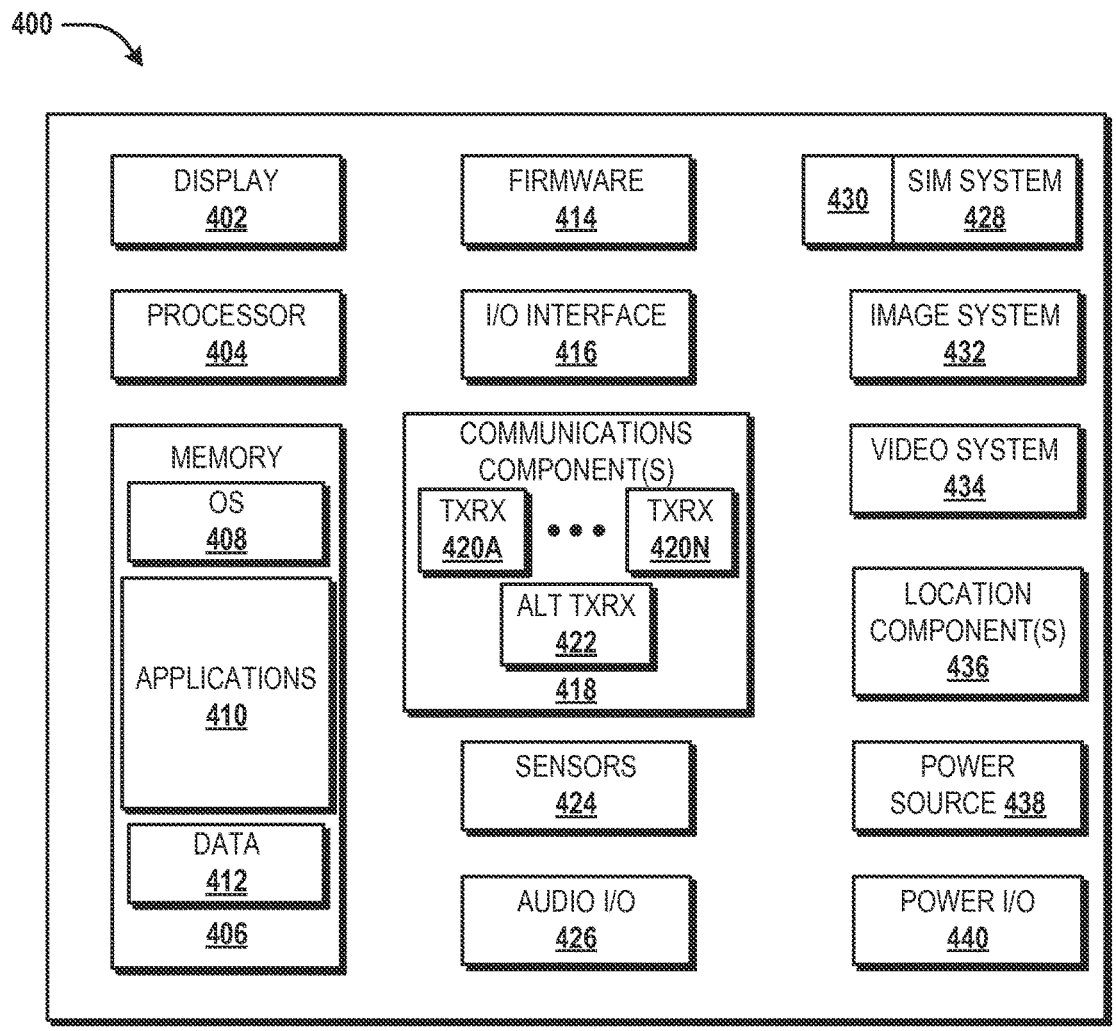
FIG. 4 is a block diagram illustrating an example mobile device capable of implementing aspects of the embodiments disclosed herein.

Turning now to FIG. 4, an illustrative mobile device 400 and components thereof will be described. While connections are not shown between the various components illustrated in FIG. 4, it should be understood that some, none, or all of the components illustrated in FIG. 4 can be configured to interact with one other to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 for displaying data. According to various embodiments, the display 402 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 400 also can include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408, one or more applications 410, other computer-executable instructions stored in a memory 406, or the like. In some embodiments, the applications 410 also can include a user interface ("UI") application (not illustrated in FIG. 4).

The UI application can interface with the operating system 408 to facilitate user interaction with functionality and/or data stored at the mobile device 400 and/or stored elsewhere. In some embodiments, the operating system 408 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid a user in entering content, viewing account information, answering/initiating calls, entering/deleting data, entering and setting user IDs and passwords for device access, configuring settings, manipulating address book content and/or settings, multimode interaction, interacting with other applications 410, and otherwise facilitating user interaction with the operating system 408, the applications 410, and/or other types or instances of data 412 that can be stored at the mobile device 400. The data 412 can include, for example, one or more identifiers, and/or other applications or program modules. According to various embodiments, the data 412 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 410, the data 412, and/or portions thereof can be stored in the memory 406 and/or in a firmware 414, and can be executed by the processor 404. The firmware 414 also can store code for execution during device power up and power down operations. It can be appreciated that the firmware 414 can be stored in a volatile or non-volatile data storage device including, but not limited to, the memory 406 and/or a portion thereof.

The mobile device 400 also can include an input/output ("I/O") interface 416. The I/O interface 416 can be configured to support the input/output of data such as location information, user information, organization information, presence status information, user IDs, passwords, and application initiation (start-up) requests. In some embodiments, the I/O interface 416 can include a hardwire connection such as USB port, a mini-USB port, a micro-USB port, an audio jack, a PS2 port, an IEEE 1344 ("FIREWIRE") port, a serial port, a parallel port, an Ethernet (RJ45) port, an RJ10 port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 also can include a communications component 418. The communications component 418 can be configured to interface with the processor 404 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments one or more of the transceivers of the communications component 418 may be configured to communicate using Global System for Mobile communications ("GSM"), Code Division Multiple Access ("CDMA") ONE, CDMA2000, Long-Term Evolution ("LTE"), and various other 2G, 2.5G, 3G, 4G, and greater generation technology standards. Moreover, the communications component 418 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 418 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 418 can include a first transceiver ("TxRx") 420A that can operate in a first communications mode (e.g., GSM). The communications component 418 also can include an $N^{th}$ transceiver ("TxRx") 420N that can operate in a second communications mode relative to the first transceiver 420A (e.g., UMTS). While two transceivers 420A-420N (hereinafter collectively and/or generically referred to as "transceivers 420") are shown in FIG. 4, it should be appreciated that less than two, two, and/or more than two transceivers 420 can be included in the communications component 418.

The communications component 418 also can include an alternative transceiver ("Alt TxRx") 422 for supporting other types and/or standards of communications. According to various contemplated embodiments, the alternative transceiver 422 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 418 also can facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 also can include one or more sensors 424. The sensors 424 can include temperature sensors, light sensors, air quality sensors, movement sensors, orientation sensors, noise sensors, proximity sensors, or the like. As such, it should be understood that the sensors 424 can include, but are not limited to, accelerometers, magnetometers, gyroscopes, infrared sensors, noise sensors, microphones, combinations thereof, or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 also can include a subscriber identity module ("SIM") system 428. The SIM system 428 can include a universal SIM ("USIM"), a universal integrated circuit card ("UICC") and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Because other devices and/or modules for identifying users and/or the mobile device 400 are contemplated, it should be understood that these embodiments are illustrative, and should not be construed as being limiting in any way.

The mobile device 400 also can include an image capture and processing system 432 ("image system"). The image system 432 can be configured to capture or otherwise obtain photos, videos, and/or other visual information. As such, the image system 432 can include cameras, lenses, charge-coupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to an MMS message, email message, and sent to another mobile device. The video and/or photo content also can be shared with other devices via various types of data transfers via wired and/or wireless communication devices as described herein.

The mobile device 400 also can include one or more location components 436. The location components 436 can be configured to send and/or receive signals to determine a geographic location of the mobile device 400. According to various embodiments, the location components 436 can send and/or receive signals from global positioning system ("GPS") devices, assisted GPS ("A-GPS") devices, WI-FI/WIMAX and/or cellular network triangulation data, combinations thereof, and the like. The location component 436 also can be configured to communicate with the communications component 418 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 424 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 also can include a power source 438. The power source 438 can include one or more batteries, power supplies, power cells, and/or other power subsystems including alternating current ("AC") and/or direct current ("DC") power devices. The power source 438 also can interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative, and should not be construed as being limiting in any way.

Figure 5:
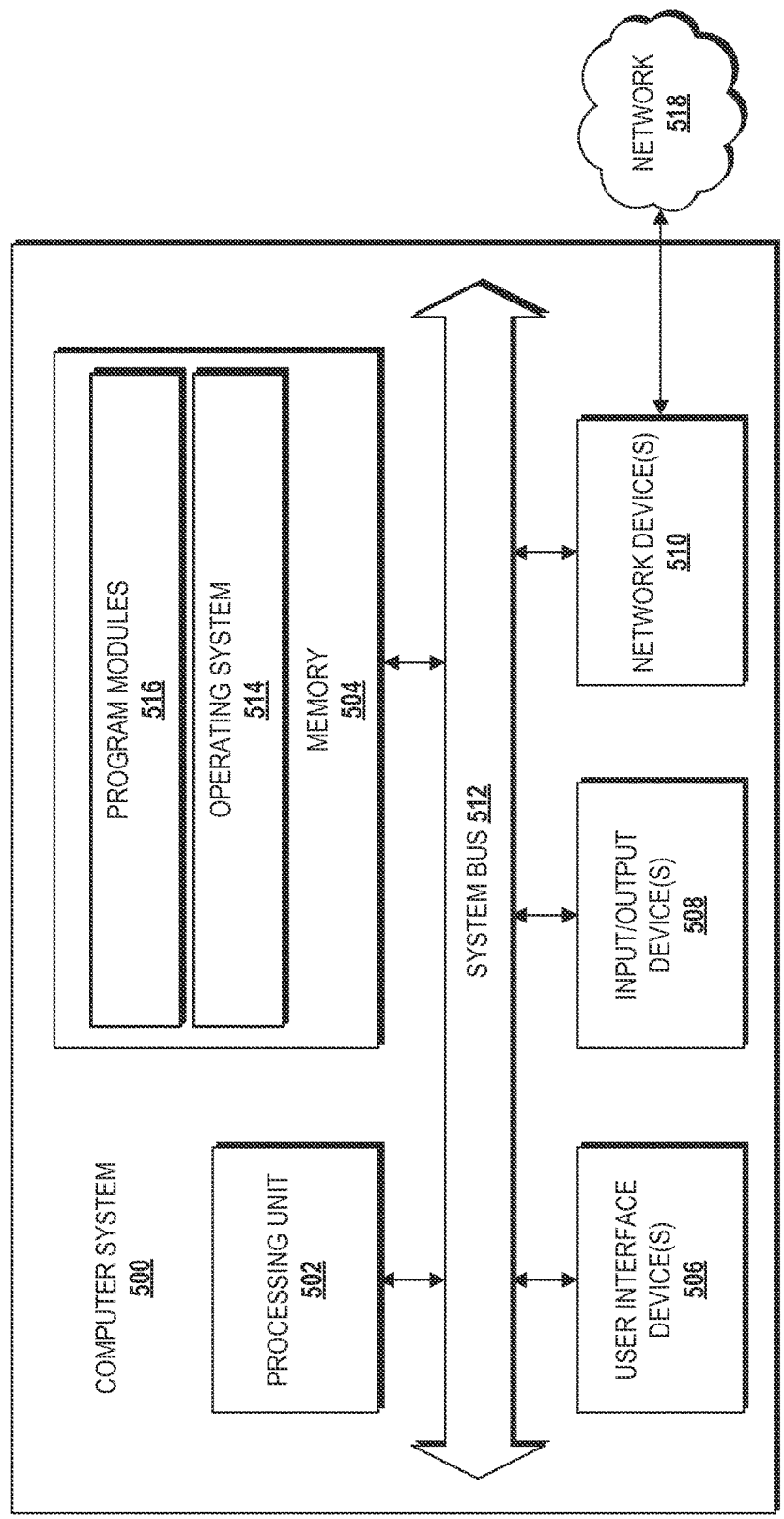
FIG. 5 is a block diagram illustrating an example computer system capable of implementing aspects of the embodiments presented herein.

FIG. 5 is a block diagram illustrating a computer system 500 configured to provide the functionality in accordance with various embodiments of the concepts and technologies disclosed herein. In some implementations, the hardware resource layer 102 (illustrated in FIG. 1) includes one or more computers that are configured like the architecture of the computer system 500. The computer system 500 may provide at least a portion of the compute resources 116, the memory resources 118, and/or the other resources 120. It should be understood, however, that modification to the architecture may be made to facilitate certain interactions among elements described herein.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein. The compute resources 116 (illustrated in FIG. 1) can include one or more processing units 502.

The memory 504 communicates with the processing unit 502 via the system bus 512. In some embodiments, the memory 504 is operatively connected to a memory controller (not shown) that enables communication with the processing unit 502 via the system bus 512. The memory resources 118 can include one or more instances of the memory 504. The illustrated memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 516 may include various software and/or program modules to perform the various operations described herein. The program modules 516 and/or other programs can be embodied in computer-readable media containing instructions that, when executed by the processing unit 502, perform various operations such as those described herein. According to embodiments, the program modules 516 may be embodied in hardware, software, firmware, or any combination thereof.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, PDAs, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer. In some embodiments, the I/O devices 508 can be used for manual controls for operations to exercise under certain emergency situations.

The network devices 510 enable the computer system 500 to communicate with other networks or remote systems via a network 518. Examples of the network devices 510 include, but are not limited to, a modem, a radio frequency ("RF") or infrared ("IR") transceiver, a telephonic interface, a bridge, a router, or a network card. The network 518 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 514 may be a wired network such as, but not limited to, a Wide Area Network ("WAN"), a wired Personal Area Network ("PAN"), or a wired Metropolitan Area Network ("MAN"). The network 518 may be any other network described herein.

Figure 6:
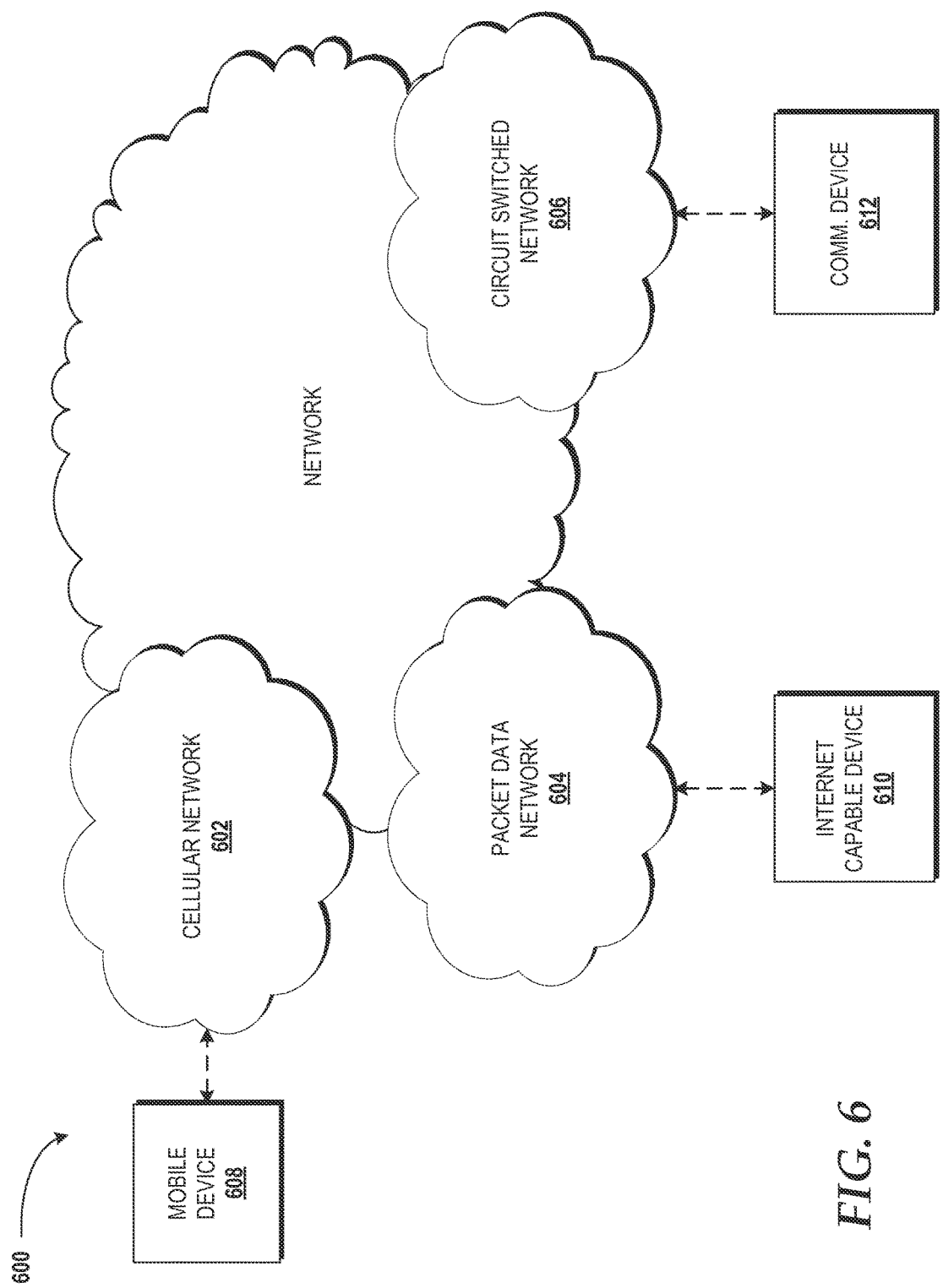
FIG. 6 is a diagram illustrating a network, according to an illustrative embodiment.

Turning now to FIG. 6, details of a network 600 are illustrated, according to an illustrative embodiment. The network 600 includes a cellular network 602, a packet data network 604, for example, the Internet, and a circuit switched network 606, for example, a PSTN. The cellular network 602 includes various components such as, but not limited to, base transceiver stations ("BTSs"), Node-B's or e-Node-B's, base station controllers ("BS Cs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards such as LTE, or the like, as well as evolved and future mobile standards.

The packet data network 604 includes various devices, for example, servers, computers, databases, and other devices in communication with one another, as is generally known. The packet data network 604 can be or can include the cloud computing system 100 illustrated and described with reference to FIG. 1. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a POTS. The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, the unmanaged TDM device 106, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network is used to refer broadly to any combination of the networks 602, 604, 606. It should be appreciated that substantially all of the functionality described with reference to the network 518 can be performed by the cellular network 602, the packet data network 604, and/or the circuit switched network 606, alone or in combination with other networks, network elements, and the like.

Based on the foregoing, it should be appreciated that concepts and technologies directed to an NPaaS layer that exposes cloud services ("NPaaS services") that can be used by OSI communication model layer 4-7 services have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A cloud computing system comprising:
   a compute resource; and
   a memory resource comprising instructions that, when executed by the compute resource, cause the compute resource to perform operations comprising
   exposing a set of cloud services for use by a service provider to provide a telecommunications service,
   receiving, from the service provider, a request for a cloud service of the set of cloud services, and
   in response to the request, providing the cloud service of the set of cloud services to the service provider to provide, at least in part, the telecommunications service.

2. The cloud computing system of claim 1, wherein the cloud service comprises a common database service that hosts data for multiple services.

3. The cloud computing system of claim 1, wherein the cloud service comprises an application container service that at least meets performance and reliability specifications for real-time services that operate within at least one of layer 4 through layer 7 of the open systems interconnection communication model.

4. The cloud computing system of claim 1, wherein the cloud service comprises a resource broker service that supports at least one protocol used by real-time services that operate within at least one of layer 4 through layer 7 of the open systems interconnection communication model.

5. The cloud computing system of claim 1, wherein the cloud service comprises a load balancer service.

6. The cloud computing system of claim 1, wherein the cloud service comprises a domain name system service.

7. The cloud computing system of claim 1, wherein the cloud service comprises a state persistence service.

8. The cloud computing system of claim 1, wherein the cloud service comprises a probe service.

9. The cloud computing system of claim 1, wherein the operations further comprise:
   receiving a request for a further cloud service; and
   providing the further cloud service in response to the request.

10. A method comprising:
exposing, by a compute resource of a cloud computing system, a set of cloud services for use by a service provider to provide a telecommunications service;
receiving, by the compute resource, from the service provider, a request for a cloud service of the set of cloud services; and
in response to the request, providing, by the compute resource, the cloud service of the set of cloud services to the service provider to provide, at least in part, the telecommunications service.

11. The method of claim 10, wherein the cloud service comprises a database service.

12. The method of claim 10, wherein the cloud service comprises an application container service.

13. The method of claim 10, wherein the cloud service comprises a resource broker service.

14. The method of claim 10, wherein the cloud service comprises a load balancer service.

15. The method of claim 10, wherein the cloud service comprises a domain name system service.

16. The method of claim 10, wherein the cloud service comprises a state persistence service.

17. The method of claim 10, wherein the cloud service comprises a probe service.

18. The method of claim 10, further comprising exposing, by the compute resource, the plurality of cloud services for further use by an external customer.

19. A cloud computing system comprising:
a plurality of compute resources; and
a plurality of memory resources, wherein
a first portion of the plurality of memory resources comprises first instructions that, when executed by a first portion of the plurality of compute resources, cause the first portion of the plurality of compute resources to perform first operations comprising creating and managing a plurality of virtual network functions,
a second portion of the plurality of memory resources comprises second instructions that, when executed by a second portion of the plurality of compute resources, cause the second portion of the plurality of compute resources to perform second operations comprising exposing a set of cloud services for use by a service provider to provide a telecommunications service, and
a third portion of the plurality of memory resources comprises third instructions that, when executed by a third portion of the plurality of compute resources, cause the third portion of the plurality of compute resources to perform third operations comprising executing at least one of the plurality of virtual network functions to provide, at least in part, the telecommunications service in response to a request received from the service provider.

20. The cloud computing system of claim 19, wherein the plurality of cloud services comprise:
a database service that provides a common pool of database resources, a data replication function, and a distributed data cache grid;
an application container service that provides a common pool of containers in which to host applications;
a resource broker and load balancer service that provide a capability of distributing requests across the plurality of virtual network functions;
a domain name system service that provides address resolution functions and domain name system translation functions;
a state persistence service that provides persistence of state in the cloud computing system; and
a probe service that provides session tracing functions.

* * * * *